US012752330B2

(12) United States Patent
Sugasawa

(10) Patent No.: US 12,752,330 B2
(45) Date of Patent: Oct. 6, 2026

(54) FOIL STAMPING DIE FOR MANUFACTURING VEHICLE INTERIOR COMPONENT

(71) Applicant: MORIROKU TECHNOLOGY COMPANY, LTD., Tokyo (JP)

(72) Inventor: Tatsuki Sugasawa, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 0 days.

(21) Appl. No.: 18/597,263

(22) Filed: Mar. 6, 2024

(65) Prior Publication Data

US 2024/0307941 A1 Sep. 19, 2024

(30) Foreign Application Priority Data

Mar. 17, 2023 (JP) ................................ 2023-042700

(51) Int. Cl.
*B41F 19/06* (2006.01)
*B21D 22/02* (2006.01)
*B21D 53/88* (2006.01)

(52) U.S. Cl.
CPC ............ *B21D 22/02* (2013.01); *B21D 53/88* (2013.01); *B41F 19/064* (2013.01); *B41P 2219/30* (2013.01)

(58) Field of Classification Search
USPC ...................................... 101/4, 9, 21, 28, 31
See application file for complete search history.

(56) References Cited

U.S. PATENT DOCUMENTS 3,584,572 A * 6/1971 Apicella ............... B41F 19/068 101/30
4,130,623 A * 12/1978 Walter ................... B29C 59/02 264/293

FOREIGN PATENT DOCUMENTS

JP S52-46942 1/1977
JP 53-5563 U 1/1978
JP S55-42905 Y2 1/1978
JP 04-232772 A * 8/1992
JP 2001-18234 A 1/2001
JP 2005-22272 A 1/2005
JP 2008-049835 A 3/2008
JP 2008-110558 A 5/2008
JP 2010125529 A * 6/2010
JP 2011-173294 A 9/2011

(Continued)

OTHER PUBLICATIONS

English language translation of JP 2010-125529 A to Chin et al., publication date Jun. 10, 2010. (Year: 2010).*

(Continued)

*Primary Examiner* — Leslie J Thompson

(74) *Attorney, Agent, or Firm* — Rankin, Hill & Clark LLP

(57) ABSTRACT

The present invention relates to a foil stamping die used for foil stamping, and a method of manufacturing a vehicle interior component using the foil stamping die. An object of the present invention is to provide a foil stamping technique capable of enhancing the design property of a printing object. In a foil stamping die capable of transferring a foil to the printing object while applying an uneven pattern to a surface of the printing object by pressing the die toward the printing object on which the foil is placed, a pattern-shape portion which is a portion corresponding to the uneven pattern is provided, and an edge of the pattern-shape portion has the same thickness over the entire area thereof.

6 Claims, 8 Drawing Sheets

EMBODIMENT

(56) References Cited

FOREIGN PATENT DOCUMENTS

| | | |
|---|---|---|
| JP | 5054944 B | 10/2012 |
| JP | 5054944 B2 | 10/2012 |

OTHER PUBLICATIONS

English language translation of JP H04-232772, publication date Aug. 21, 1992. (Year: 1992).*

English machine translation of Japanese Office Action dated Jul. 28, 2026 issued in related Japanese application No. 2025-167996; 8 pages.

* cited by examiner

EMBODIMENT

COMPARATIVE EXAMPLE

FOIL STAMPING DIE FOR MANUFACTURING VEHICLE INTERIOR COMPONENT

FIELD OF THE INVENTION

The present invention relates to a foil stamping die used for foil stamping, and a method of manufacturing a vehicle interior component using the foil stamping die.

BACKGROUND

Japanese Patent No. 5054944 discloses a pseudo seam pattern that is formed on a synthetic resin sheet by embossing, and also discloses the seam pattern decorated by foil stamping.

SUMMARY

Studies carried out by the inventors of the present invention revealed that a foil adheres to a printing object (stamping object) in a range exceeding an edge of an uneven pattern when a transferring process is applied to the printing object by foil stamping. If the foil adheres to a range greatly exceeding the edge of the pattern, the deviation between the three-dimensionally formed portion and a colored portion increases, and the design property of the printing object deteriorates.

According to the present disclosure, there is provided a foil stamping die that can be pressed against a printing object, on which a foil is placed, to transfer the foil to the printing object while applying an uneven pattern to a surface of the printing object, the foil stamping die includes a pattern-shape portion which is a portion corresponding to the uneven pattern, and an edge of the pattern-shape portion has a same thickness over an entire area thereof.

According to the present disclosure, it is possible to provide a foil stamping that can enhance the design property of the printing object.

DETAILED DESCRIPTION

Embodiments of the present invention will be described below with reference to the accompanying drawings.

First Embodiment

A first embodiment will be described with reference to the drawings.

Figure 1:
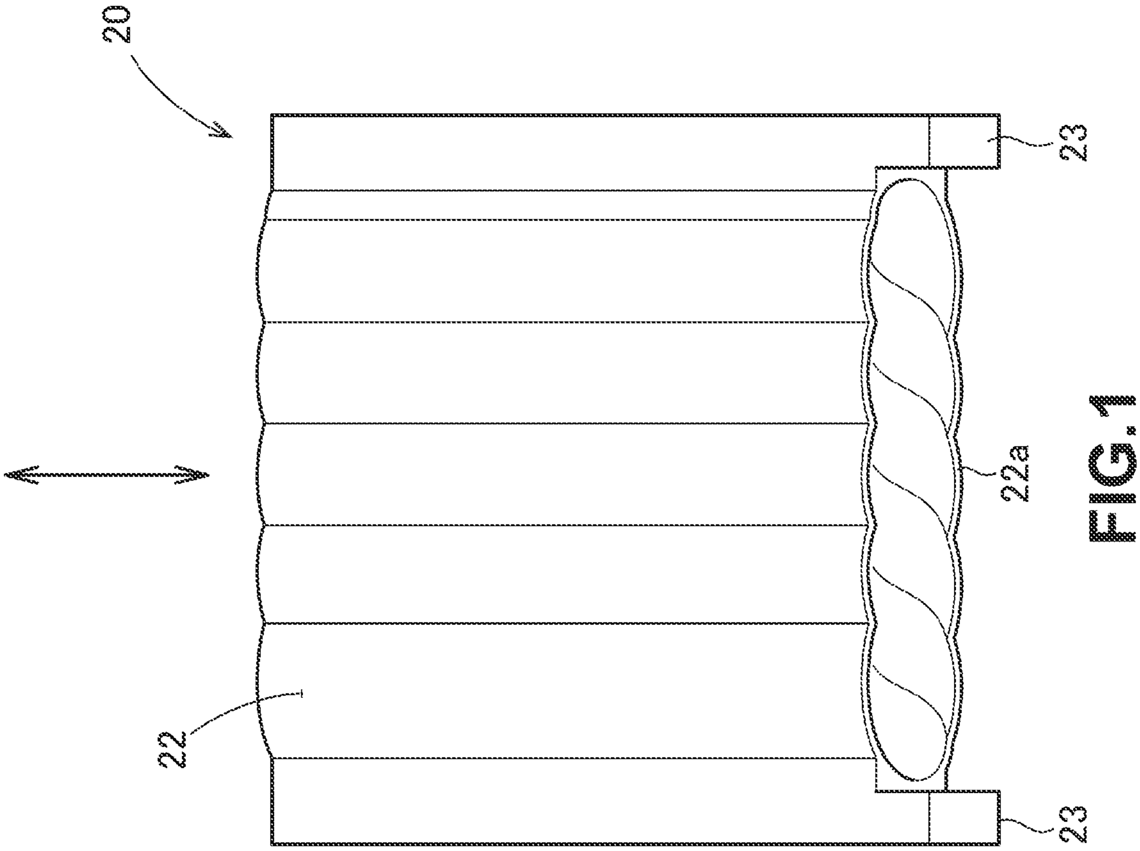
FIG. 1 is a perspective view that illustrates a main part of a foil stamping die according to a first embodiment of the invention.

Referring to FIG. 1, a foil stamping die 20 is used in, for example, a transfer device that is manually moved up and down. The foil stamping die 20 is provided in the transfer device such that the foil stamping die 20 can move up and down. In addition to the foil stamping die 20, the transfer device may include a heater for heating the foil stamping die 20, an operation lever for raising and lowering the foil stamping die 20, and other components.

Figure 2:
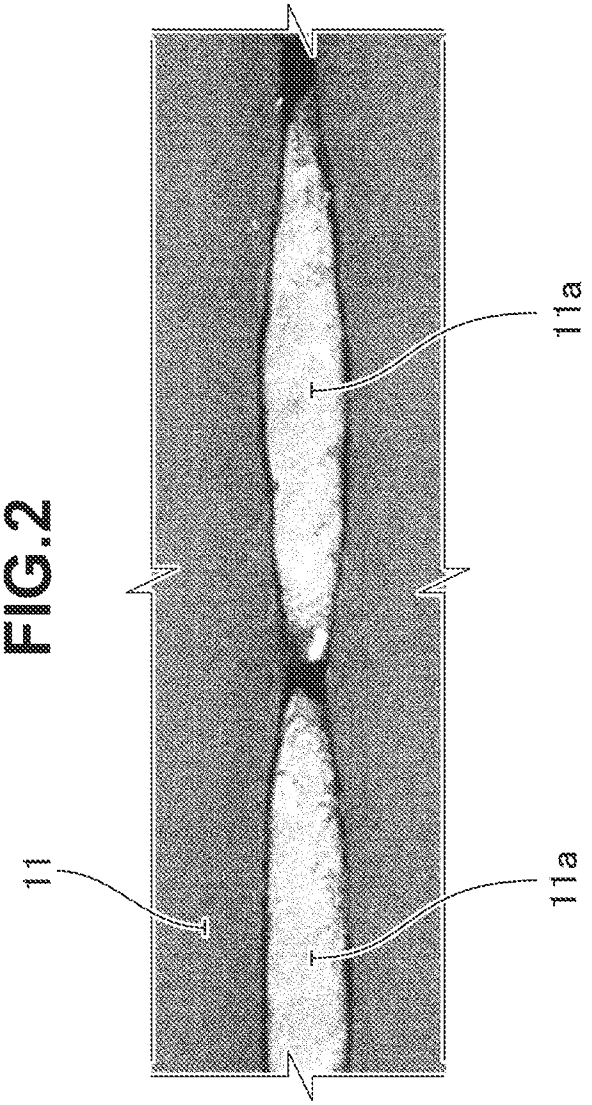
FIG. 2 is a view useful to describe foil stamping using the foil stamping die illustrated in FIG. 1.

Reference is also made to FIG. 2. The foil stamping die 20 includes a single pattern-shape portion 22 and two protrusions 23 formed at opposite ends of the pattern-shape portion 22 to sandwich the pattern-shape portion 22.

When the transfer is carried out, the pattern-shape portion 22 is pressed against a printing object 11 and a foil, and forms a predetermined pattern on a surface of the printing object 11 and transfers the foil thereon.

As will be described in detail later, the foil is a sheet that is sandwiched between the foil stamping die 20 and the printing object 11 and has a color (or colors) that will be transferred to the printing object 11.

When the foil stamping die 20 is pressed, the surface of the printing object 11 is formed into a shape that corresponds to the pattern-shape portion 22 and the protrusions 23, and the foil is transferred to color the surface of the printing object 11. For example, an uneven (three-dimensional) seam pattern 11*a* is formed on the printing object 11. The seam pattern (stich pattern) 11*a* is formed in a straight line by moving the printing object 11 to a predetermined position relative to the foil stamping die 20 and repeatedly lowering the foil stamping die 20.

The printing object 11 is, for example, an interior component for a vehicle. Hereinafter, the printing object 11 may be referred to as a vehicle interior component 11. More specifically, an example of the vehicle interior component 11 may be a skin (surface material) of an instrument panel. By making the seam pattern 11*a* on the skin of the instrument panel, a high-grade feeling can be produced by the vehicle interior component 11.

Figure 3:
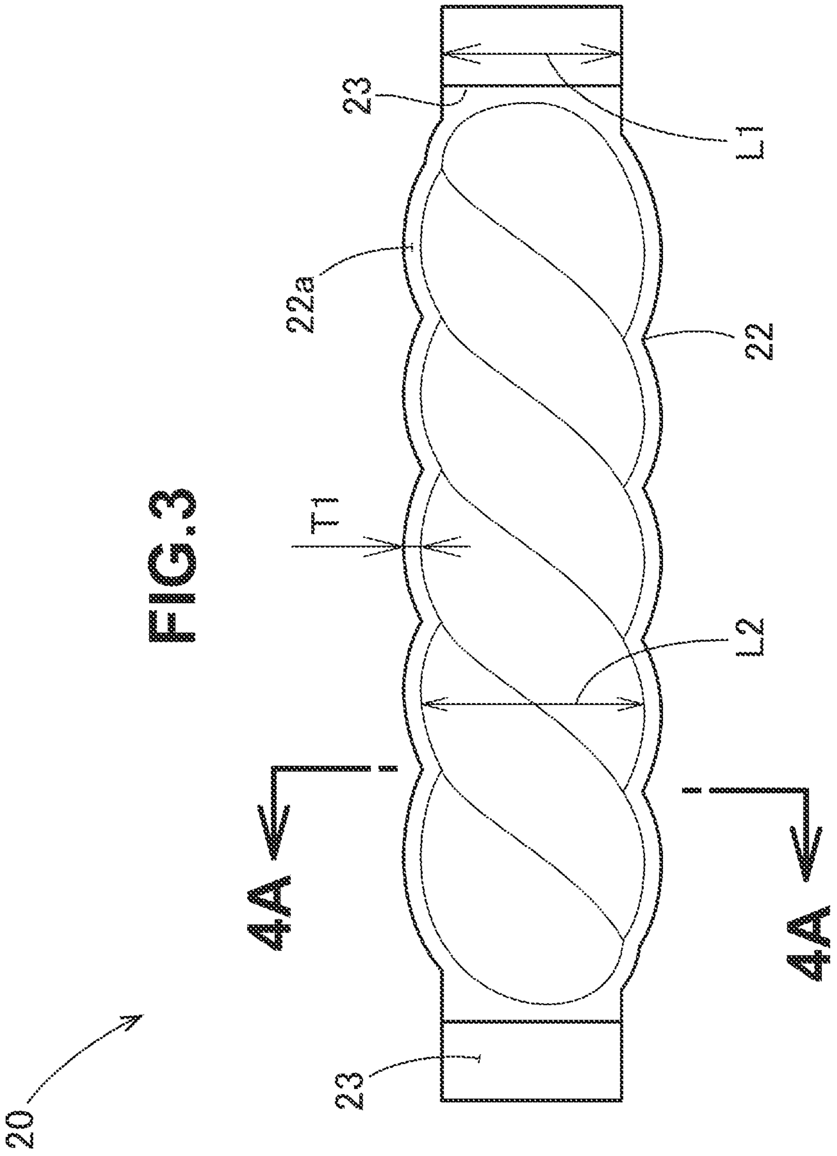
FIG. 3 is a bottom view of FIG. 1.

Referring to FIGS. 2 and 3, a front end of the pattern-shape portion 22 is formed in a concave shape that conforms to the shape of the seam pattern 11*a*. The bottom of the concave-shaped portion has oblique lines that are similar to a pattern of a sewing thread.

Figure 4C:
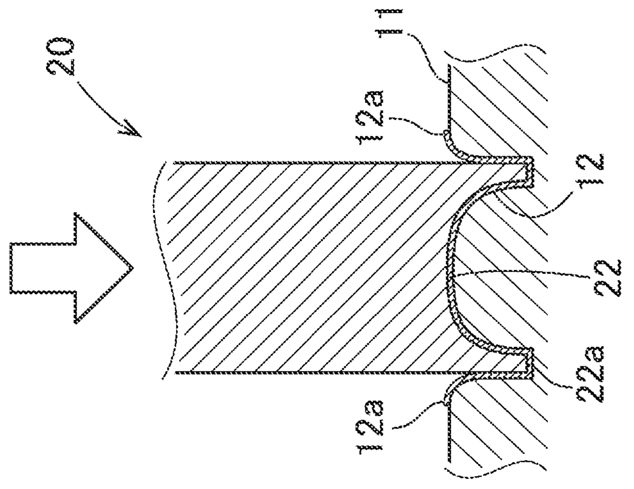
FIG. 4C is a view useful to describe a foil stamping step.
Figure 4B:
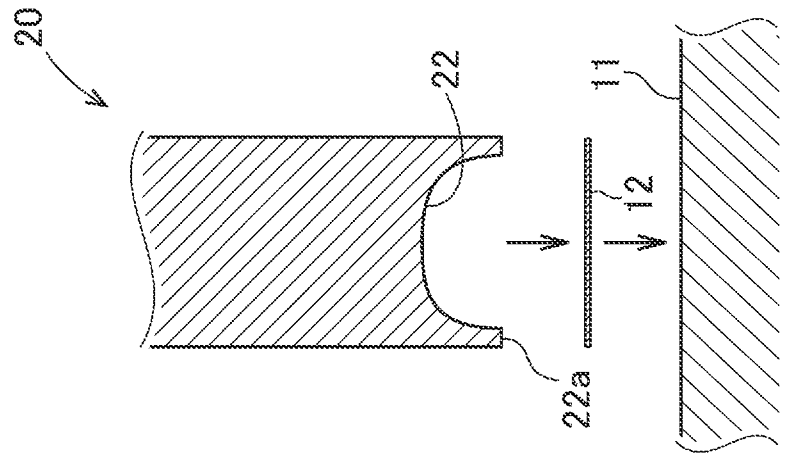
FIG. 4B is a view useful to describe a preparation step.
Figure 4A:
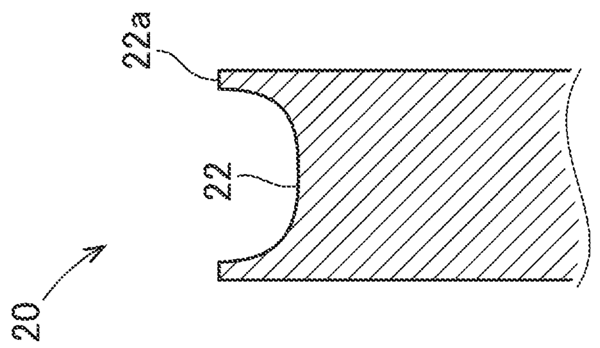
FIG. 4A is a cross-sectional view taken along the line 4A-4A in FIG. 3.

Reference is made to FIG. 4A. When the direction corresponding to the extending direction of the seam pattern is referred to as the longitudinal direction, and the direction perpendicular to the longitudinal direction is referred to as the width direction, a cross section taken in the width direction is illustrated in FIG. 4A. The front end of the pattern-shape portion 22 is formed in a concave shape in a substantially U-shape.

Referring to FIG. 3, an edge 22*a* of the pattern-shape portion 22 is formed in a cloud (or wave) shape, and the thickness T1 of the edge 22*a* is constant over the entire area thereof. The pattern-shape portion 22 corresponds to one seam pattern 11*a* (see FIG. 2).

The protrusions 23 are formed at the opposite ends in the longitudinal direction of the pattern-shape portion 22 and protrude higher than the pattern-shape portion 22. The length (width) L1 of each of the protrusions 23 in the width direction is shorter than the length (width) L2 of the pattern-shape portion 22 in the width direction. The protrusion 23 is formed so as to fit or stay within a region between the pattern-shape portion 22 and an adjacent pattern-shape portion 22 and not to extend beyond that region.

Reference is also made to FIG. 2. When the seam patterns 11*a* are continuously (repeatedly) formed, a portion between the seam pattern 11*a* and the adjacent seam pattern 11*a* on the printing object 11 is formed by the protrusion 23. As the region between the seam pattern 11*a* and the adjacent seam pattern 11*a* is recessed deeper by the protrusion 23, the color of the region between the seam pattern 11*a* and the adjacent seam pattern 11*a* is less visible from the surface. This makes the area between the seam and the seam.

Next, a method of manufacturing the vehicle interior component 11 will be described.

Reference is made to FIG. 4B. First, the vehicle interior component 11 before printing, a foil 12, and the foil stamping die 20 are prepared (preparation step), and the foil 12 is placed on the upper surface of the vehicle interior component 11 (placement step).

Reference is made FIG. 4C. Next, the heated foil stamping die 20 is pressed toward the vehicle interior component 11 (foil stamping step) such that the shape of the surface of the vehicle interior component 11 is formed into a shape that corresponds to the pattern-shape portion 22, and the foil 12 is transferred thereon.

Figure 5B:
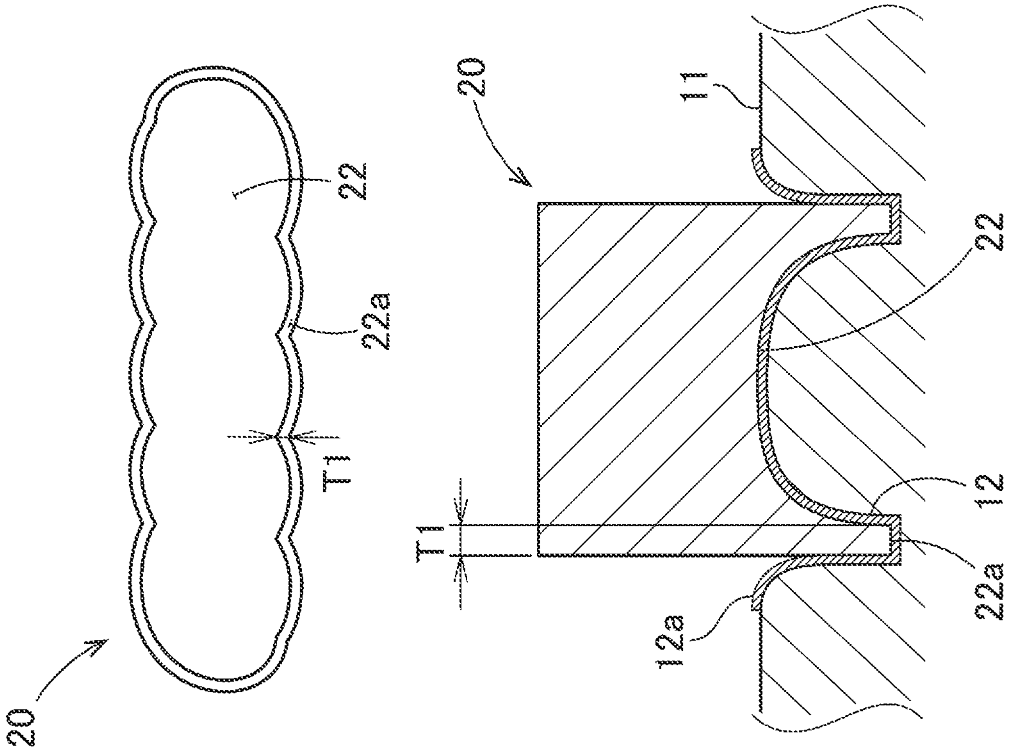
FIG. 5B is a set of views useful to describe advantages of the embodiment of the invention.
Figure 5A:
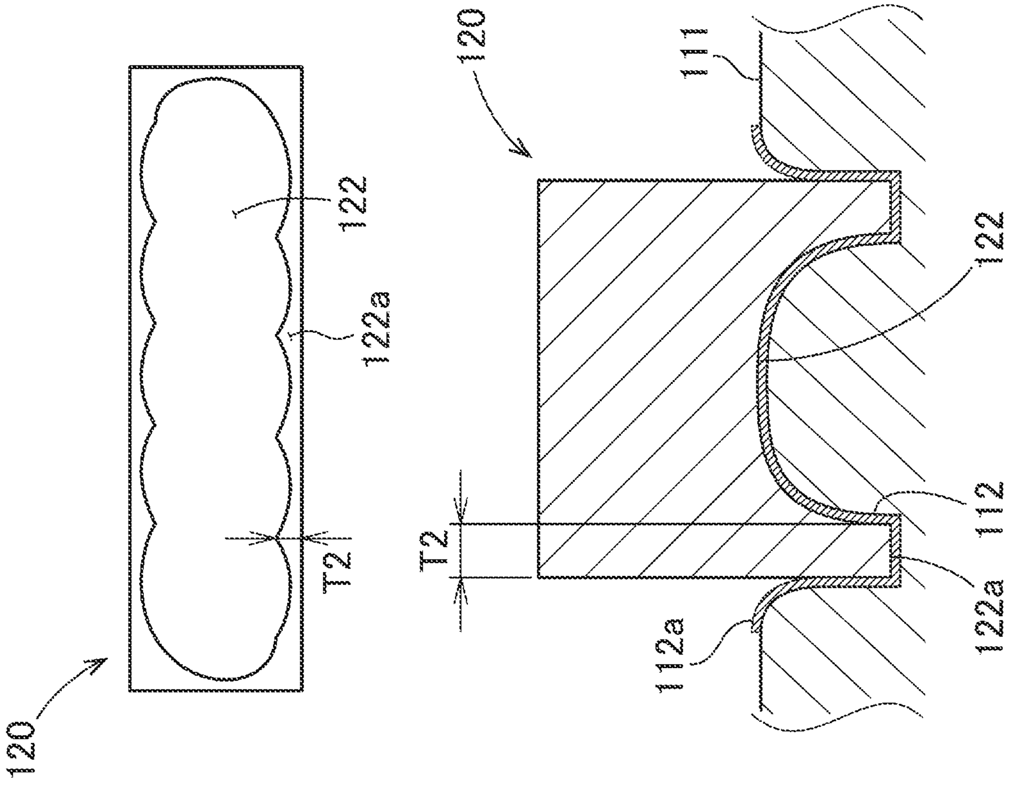
FIG. 5A is a set of views useful to describe disadvantages of a comparative example.

Reference is made to FIG. 5A that illustrates a comparative example of a foil stamping die 120. In the foil stamping die 120 of the comparative example, the inside of a pattern-shape portion 122 is formed in a shape that conforms to an uneven pattern and the outside of the pattern-shape portion 122 is formed in a substantially rectangular shape. Therefore, the thickness of an edge 122*a* changes. For example, the thickness of the pattern-shape portion 122 is T2 at a portion where the pattern becomes thinner. This thickness T2 is thicker than T1 where the edge 122*a* is the thinnest.

When a foil 112 is transferred to a printing object 111, a part of the foil 112 is pushed out by the foil stamping die 120 such that the foil 112 adheres to an area that exceeds the edge 122*a* of the uneven pattern-shape portion 122 (see 112*a*).

Reference is made to FIG. 5B that illustrates the foil stamping die 20 according to the embodiment of the invention. In the foil stamping die 20 of the embodiment, the edge 22*a* of the pattern-shape portion 22 has the same thickness T1 over the entire area thereof. When the foil stamping die 20 is used, the foil 12 adheres up to a position T1 away from the end of the pattern-shape portion 22 (see 12*a*).

Second Embodiment

Next, a second embodiment of the invention will be described with reference to the drawings.

Figure 6:
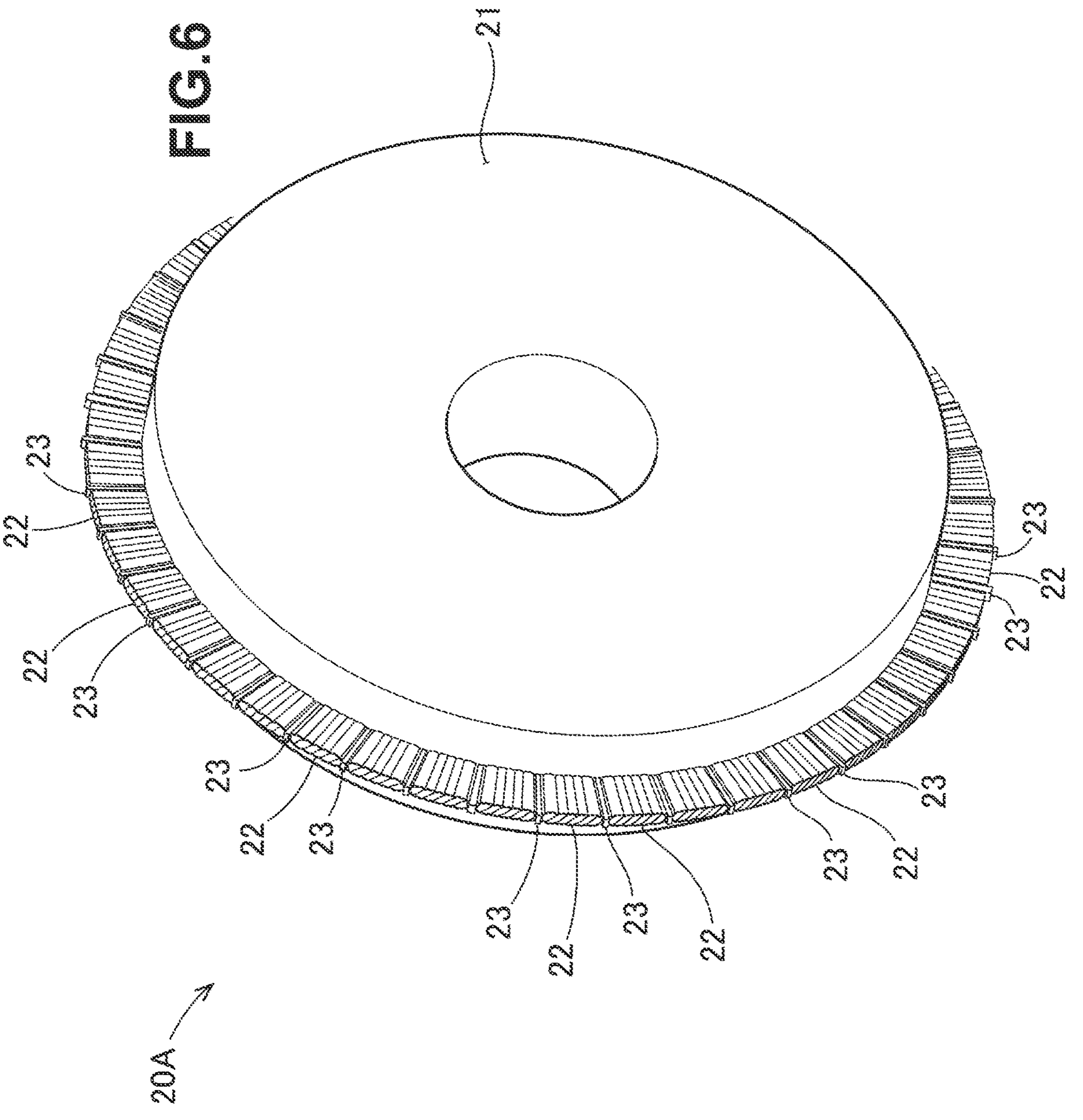
FIG. 6 is a perspective view of a foil stamping die according to a second embodiment of the invention.

FIG. 6 illustrates a foil stamping die 20A according to the second embodiment. The foil stamping die 20A of the second embodiment is rotatably provided in a printing device for performing foil stamping (hot stamping), for example. Elements and parts that are common to the first embodiment are assigned the same reference numerals, and detailed description thereof will be omitted.

Figure 7:
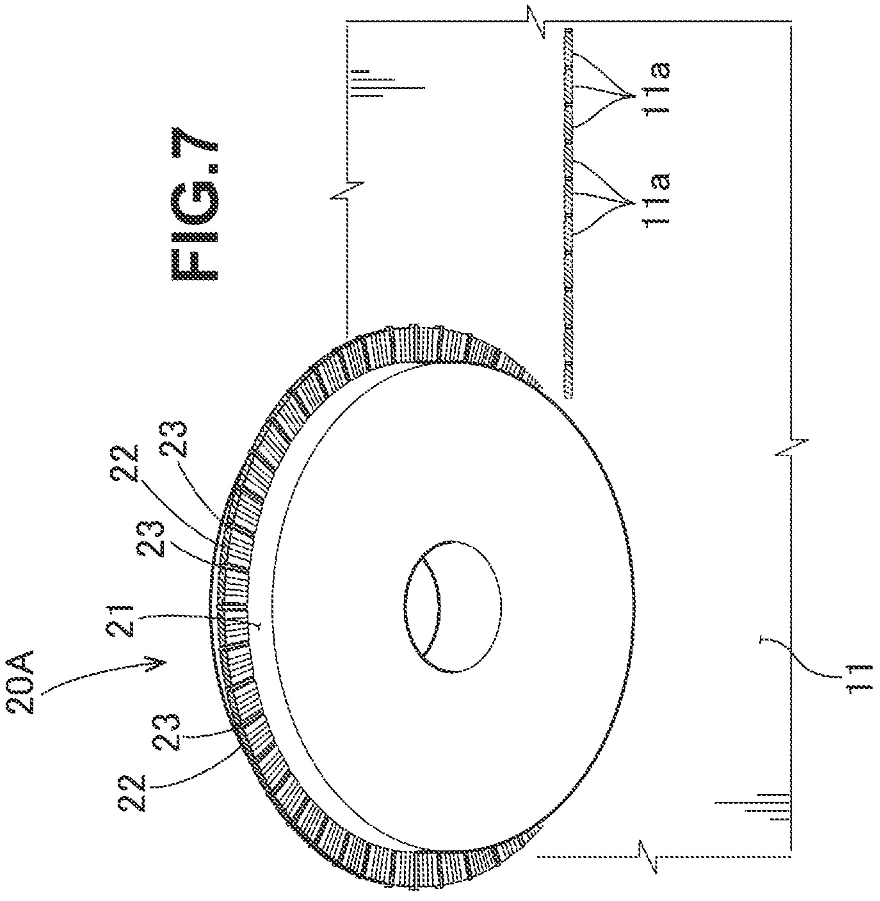
FIG. 7 is a view useful to describe foil stamping using the foil stamping die illustrated in FIG. 6.

Reference is also made to FIG. 7. The foil stamping die 20A has a substantially O-shaped main body 21, pattern-shape portions 22 and protrusions 23. The pattern-shape portions 22 and the protrusions 23 are alternately provided on an outer peripheral surface of the main body 21 and pressed against the printing object 11.

The printing device which is equipped with the foil stamping die 20A may include conveyance rollers for feeding the printing object 11, conveyance rollers for feeding the foil between the foil stamping die 20A and the printing object 11, a heater for heating the foil stamping die 20A, and other components, in addition to the foil stamping die 20A.

Third Embodiment

Next, a third embodiment of the invention will be described with reference to the drawings.

Figure 8:
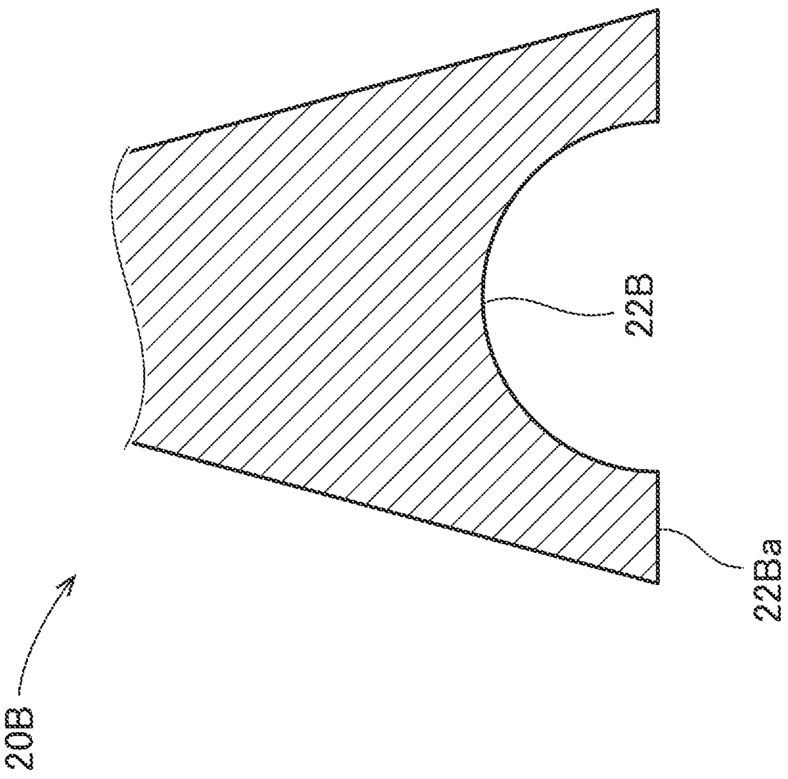
FIG. 8 is a cross-sectional view of a foil stamping die according to a third embodiment of the invention.

FIG. 8 illustrates a cross-sectional configuration of a foil stamping die 20B according to the third embodiment. In the foil stamping die 20B, each of edges 22Ba of a pattern-shape portion 22B is widened toward a leading end.

The foil stamping die 20B in which the edges 22Ba of the pattern-shape portion 22B become wider toward the respective leading ends may be rotatably provided in a printing device or may be used in a transfer device that moves up and down manually.

The above-described foil stamping dies and the method of manufacturing the above-described vehicle interior component will be summarized below.

Reference is made to FIGS. 2 and 3. First, the foil stamping die 20 can transfer the foil onto the printing object 11 while applying an uneven pattern to the surface of the printing object 11 by stamping the foil stamping die 20 toward the printing object 11 on which the foil is placed. The foil stamping die 20 has the pattern-shape portion 22 that is a portion corresponding to the uneven pattern. The pattern-shape portion 22 has the edge 22*a* formed in the same thickness T1 over the entire area thereof. The same applies to the foil stamping die 20A (see FIG. 6) and the foil stamping die 20B (see FIG. 8).

Reference is made to FIG. 5A. As described above, when the foil 112 is transferred to the printing object 111, the foil 112 is pressed by the foil stamping die 120 so that a part of the foil 112 exceeds the edge of the uneven pattern (see 112*a*). If the foil 112 adheres to a large distance beyond the edge of the pattern, the design property of the printing object 111 drops. When the foil stamping die 120 of the comparative example is used, the thickest portion of the edge 122*a* of the foil stamping die 120 causes the foil 112 to adhere up to a position T2 away from the end of the pattern-shape portion 122.

Reference is made to FIG. 5B. In the foil stamping die 20 according to the embodiment, the edge 22*a* of the pattern-shape portion 22 has the same thickness T1 over the entire area thereof. When the foil stamping die 20 is used, the foil 12 adheres to a position which is separated from the pattern by T1. As compared with the case where the foil stamping die 120 of the comparative example is used, the range in which the foil 12 adheres can be narrowed. As a result, it is possible to provide the printing object 11 with high design property.

Reference is made to FIGS. 2 and 3. Second, it is preferred that the first foil stamping die 20 is used, the pattern 11*a* is the seam pattern 11*a* and the pattern-shape portion 22 corresponds to a single seam. When the direction corresponding to the extending direction of the seam pattern 11*a* on the surface of the printing object 11 is referred to as the longitudinal direction, and the direction perpendicular to the longitudinal direction is referred to as the width direction, the die further includes the protrusions 23 that protrude higher than the pattern-shape portion 22 at the ends in the longitudinal direction of the pattern-shape portion 22. The length L1 of each of the protrusions 23 in the width direction is shorter than the length L2 of the pattern-shape portion 22 in the width direction. The same applies to the foil stamping die 20A (see FIG. 6) and the foil stamping die 20B (see FIG. 8).

Since the protrusions 23 are formed, it is possible to appropriately separate the seam pattern from the adjacent seam pattern. In particular, depth of this portion, which is made by the respective protrusion, is deeper than the adjacent portion, it is possible to suppress or avoid that the foil 12 adhering to an unintended area appears on the surface, and therefore it is possible to further enhance the design property.

Further, because the length L1 of the protrusion 23 in the width direction is shorter than the length L2 of the pattern-shape portion 22 in the width direction, the area between the seam pattern and the seam pattern can be made thinner, and the seam pattern can be represented like a real seam, i.e., the design property can be enhanced.

Reference is made to FIG. 8. Third, it is preferred that the first or second foil stamping die 20B is used, and each of the edges 22Ba of the pattern-shape portion 22B spreads towards the leading edge thereof. As a result, the area where the foil adheres can be made narrower, and the design property of the printing object 11 (see FIG. 2B) can be further improved.

Reference is made to FIG. 4C. Fourth, it is preferred that the vehicle interior component 11 is manufactured by performing the foil stamping using the foil stamping die 20 according to any one of the first foil stamping die, the second foil stamping die and the third foil stamping die. In other words, the vehicle interior component 11 is manufactured by the foil stamping process. The foil stamping may be performed using the foil stamping die 20A (see FIG. 6) or the foil stamping die 20B (see FIG. 8). The vehicle interior component 11 having a high-grade feeling with high design property can be provided, which is preferable.

Although the foil stamping die according to the present invention has been described by way of examples in which the seam pattern is transferred to the vehicle interior component, the printing object may be other than the vehicle interior component, or the pattern to be transferred may be a pattern other than the seam pattern. That is, the present invention is not limited to the embodiments as long as the functional features and the advantageous effects of the present invention are achieved.

What is claimed is:

1. A foil stamping die that can be pressed against a printing object, on which a foil is placed, to transfer the foil to the printing object while applying an uneven pattern to a surface of the printing object, the foil stamping die comprising:

a pattern-shape portion which is a portion corresponding to the uneven pattern, and an edge portion entirely surrounding the pattern-shape portion, the edge portion having a constant thickness, wherein a direction corresponding to a direction in which the uneven pattern extends on the surface of the printing object is a longitudinal direction and a direction orthogonal to the longitudinal direction is a width direction, the foil stamping die further comprising:

a protrusion at a longitudinal-direction end of the pattern-shape portion, the protrusion extending farther than the pattern-shape portion such that the pattern-shape portion is recessed relative to the protrusion, and, wherein the edge portion is disposed between the protrusion and the pattern-shape portion at the longitudinal-direction end of the pattern-shape portion.

2. The foil stamping die according to claim 1, wherein the pattern is a seam pattern, the pattern-shape portion is a single seam.

3. The foil stamping die according to claim 1, wherein a length of the protrusion in the width direction is shorter than a length of the pattern-shape portion in the width direction.

4. The foil stamping die according to claim 1, wherein the edge of the pattern-shape portion spreads in the width direction toward a leading end, which is an end of the stamping die in a direction orthogonal to both the longitudinal direction and the width direction.

5. A foil stamping die that can be pressed against a printing object, on which a foil is placed, to transfer the foil to the printing object while applying an uneven pattern to a surface of the printing object, the foil stamping die comprising:

a pattern-shape portion which is a portion corresponding to the uneven pattern, an edge portion entirely surrounding the pattern-shape portion, the edge portion having a constant thickness, wherein a direction corresponding to a direction in which the uneven pattern extends on the surface of the printing object is a longitudinal direction and a direction orthogonal to the longitudinal direction is a width direction, wherein an end of the edge portion, which is an end in a direction orthogonal to both the longitudinal direction and the width direction is a flat surface and the entire pattern-shape portion and edge portion abuts against the foil, and the foil is transferred to the surface of the printing object over the entire pattern-shape portion and edge portion, wherein at least a portion of the pattern-shape portion is a recess that is recessed from the end of the edge portion, and the recess of the pattern-shape portion has a curved surface.

6. A foil stamping die that can be pressed against a printing object, on which a foil is placed, to transfer the foil to the printing object while applying an uneven pattern to a surface of the printing object, the foil stamping die comprising:

a pattern-shape portion which is a portion corresponding to the uneven pattern, an edge portion entirely surrounding the pattern-shape portion, the edge portion having a constant thickness, wherein a direction corresponding to a direction in which the uneven pattern extends on the surface of the printing object is a longitudinal direction and a direction orthogonal to the longitudinal direction is a width direction, an end of the edge portion, which is an end in a direction orthogonal to both the longitudinal direction and the width direction is a flat surface, and wherein at least a portion of the pattern-shape portion is a recess that is recessed from the end of the edge portion, and the recess of the pattern-shape portion has a curved surface.

* * * * *